United States Patent
Krueger

(10) Patent No.: US 11,598,634 B2
(45) Date of Patent: Mar. 7, 2023

(54) APPARATUS AND METHOD FOR AUTOMATICALLY EVALUATING CHASSIS OR WHEEL ALIGNMENT MEASUREMENT DATA

(71) Applicant: Beissbarth GmbH, Munich (DE)

(72) Inventor: Christof Krueger, Karlsfeld (DE)

(73) Assignee: BEISSBARTH GMBH, Munich (DE)

( * ) Notice: Subject to any disclaimer, the term of this patent is extended or adjusted under 35 U.S.C. 154(b) by 719 days.

(21) Appl. No.: 16/604,856

(22) PCT Filed: Apr. 3, 2018

(86) PCT No.: PCT/EP2018/058437
§ 371 (c)(1),
(2) Date: Oct. 11, 2019

(87) PCT Pub. No.: WO2018/188985
PCT Pub. Date: Oct. 18, 2018

(65) Prior Publication Data
US 2020/0166337 A1 May 28, 2020

(30) Foreign Application Priority Data
Apr. 12, 2017 (DE) .......................... 102017206306.8

(51) Int. Cl.
*G01B 21/26* (2006.01)
*G06V 20/20* (2022.01)

(52) U.S. Cl.
CPC ............. *G01B 21/26* (2013.01); *G06V 20/20* (2022.01); *G01B 2210/26* (2013.01);
(Continued)

(58) Field of Classification Search
CPC .... G01B 21/26; G01B 2210/26; G06V 20/20; G06V 2201/08; G06V 2201/09; G06V 2201/10; G01M 17/007
See application file for complete search history.

(56) References Cited

U.S. PATENT DOCUMENTS

| | | | |
|---|---|---|---|
| 6,374,159 B1* | 4/2002 | Naruse | G01M 17/0074 356/139.09 |
| 7,359,775 B2* | 4/2008 | Strege | G01B 21/26 701/34.3 |

(Continued)

FOREIGN PATENT DOCUMENTS

| | | |
|---|---|---|
| CN | 110770563 B | 2/2022 |
| DE | 102012219338 A1 | 4/2014 |

(Continued)

OTHER PUBLICATIONS

International Search Report for PCT/EP2018/058437, dated Aug. 1, 2018.

*Primary Examiner* — Yaritza Guadalupe-McCall
(74) *Attorney, Agent, or Firm* — Gerard A. Messina; Norton Rose Fulbright US LLP

(57) ABSTRACT

An apparatus for automatically evaluating chassis or wheel alignment measurement data comprises: a memory device configured to store a number of chassis data records, with each chassis data record containing at least one chassis parameter and a tolerance range allocated to each chassis parameter; a provisioning device configured to provide a data record of current chassis parameters, which comprises at least one current chassis parameter; a selection device configured to select, on the basis of the data record provided by the provisioning device, a subset of chassis data records from the chassis data records stored in the memory device; and a determination device configured to determine the proportion of the chassis data records from the subset of chassis data records for which the current chassis parameter's of the data record provided by the provisioning device are within the specified tolerance ranges.

17 Claims, 2 Drawing Sheets

(52) U.S. Cl.
CPC ...... *G06V 2201/08* (2022.01); *G06V 2201/09* (2022.01); *G06V 2201/10* (2022.01)

(56) References Cited

U.S. PATENT DOCUMENTS

| | | | | |
|---|---|---|---|---|
| 7,647,827 B2* | 1/2010 | Pelecanos | ................ | G01H 1/00 |
| | | | | 73/579 |
| 7,685,872 B2* | 3/2010 | David | ................ | G01M 15/102 |
| | | | | 73/123 |
| 10,072,926 B2* | 9/2018 | Rogers | ................ | G01B 11/275 |
| 10,539,413 B2* | 1/2020 | Minor | ................ | G01B 11/14 |
| 10,685,506 B2* | 6/2020 | Tong | ................ | G07C 5/008 |
| 11,148,620 B2* | 10/2021 | Wippler | ................ | B60W 50/14 |
| 2002/0189114 A1 | 12/2002 | Voeller et al. | | |
| 2005/0022398 A1 | 2/2005 | Healy | | |
| 2005/0154497 A1* | 7/2005 | Strege | ................ | G05B 23/0221 |
| | | | | 700/279 |
| 2007/0088472 A1* | 4/2007 | Ganzhorn, Jr. | ..... | G01M 15/102 |
| | | | | 701/31.4 |
| 2007/0256499 A1* | 11/2007 | Pelecanos | ................ | G01H 1/00 |
| | | | | 73/579 |
| 2008/0041147 A1* | 2/2008 | David | ................ | G01L 5/282 |
| | | | | 73/123 |
| 2008/0257047 A1* | 10/2008 | Pelecanos | ................ | G01H 1/00 |
| | | | | 702/56 |
| 2010/0292897 A1* | 11/2010 | Hub | ................ | G01B 21/26 |
| | | | | 701/41 |
| 2012/0166035 A1* | 6/2012 | Boss | ................ | G07C 5/085 |
| | | | | 701/29.4 |
| 2016/0178359 A1* | 6/2016 | Minor | ................ | G06V 20/20 |
| | | | | 348/135 |
| 2017/0097229 A1* | 4/2017 | Rogers | ................ | H04N 5/247 |
| 2019/0325670 A1* | 10/2019 | Tong | ................ | G07C 5/008 |
| 2020/0158501 A1* | 5/2020 | Minor | ................ | G07C 5/08 |
| 2020/0166337 A1* | 5/2020 | Krueger | ................ | G01M 17/007 |

FOREIGN PATENT DOCUMENTS

| | | |
|---|---|---|
| DE | 102013206050 A1 | 10/2014 |
| EP | 3610235 B1 | 6/2021 |
| WO | 9405969 A1 | 3/1994 |

* cited by examiner

APPARATUS AND METHOD FOR AUTOMATICALLY EVALUATING CHASSIS OR WHEEL ALIGNMENT MEASUREMENT DATA

FIELD OF THE INVENTION

The present invention relates to an apparatus and a method for automatically evaluating measurement data from a chassis or wheel alignment measurement (chassis or wheel alignment measurement data).

BACKGROUND INFORMATION

In a wheel alignment measurement, measured values (e.g. for toe and camber) are compared with target data specified by the particular vehicle manufacturer. On the basis of the target values and tolerances contained in the target data, an evaluation can be made and the result displayed to the operator, e.g. by indicating the respective values in green (okay) or red (not okay).

The selection of the correct target data with which the measured values are compared is dependent upon the manufacturer, the model and the chassis type of the vehicle measured. The selection can be made either manually or, if an allocation to a vehicle is stored, by typing or scanning a vehicle identification number ("Vehicle Identification Number", VIN) or a license plate number.

A misaligned chassis may lead e.g. to increased tire wear and/or poorer traction on the road. It is therefore advantageous to recognize a misaligned chassis as early as possible. In the case of a quick acceptance in a workshop, an axle measuring device can be used, with which all accepted vehicles are measured, even if there is no concrete reason to assume a misaligned chassis.

Due to the fact that the correct target data are necessary for evaluating the measured values, the correct data record must be selected for each vehicle. This is a work procedure that takes a lot of time especially in case of a quick acceptance, in particular for vehicles that are so far unknown in the workshop.

It is therefore an object of the invention to simplify and accelerate the chassis or wheel alignment measurement and in particular the evaluation of chassis or wheel alignment measurement data of so far "unknown" vehicles.

SUMMARY

According to an exemplary embodiment of the invention, an apparatus for automatically evaluating chassis or wheel alignment measurement data comprises:

(A) a memory device configured to store a number of chassis or wheel alignment data records, each data record containing at least one chassis parameter and a tolerance range allocated to each chassis parameter;

(B) a provisioning device configured to provide a data record of currently measured chassis parameters, which comprises at least one chassis parameter;

(C) a selection device configured to select, on the basis of the data record of currently measured chassis parameters provided by the provisioning device, a subset of chassis data records from the chassis data records stored in the memory device; and (D) a determination device configured to determine the proportion of those chassis data records from the subset of chassis data records for which the chassis parameters of the data record provided by the provisioning device are within the tolerance ranges specified for each chassis parameter.

A method for automatically evaluating chassis or wheel alignment measurement data according to an embodiment of the invention comprises at least the following steps:

(a) providing a number of chassis or wheel alignment data records, each chassis data record including at least one chassis parameter and a tolerance range allocated to each chassis parameter;

(b) providing a data record of currently measured chassis parameters, which comprises at least one chassis parameter;

(c) selecting a subset of chassis data records from the number of chassis data records on the basis of the provided data record of currently measured chassis parameters; and (d) determining the proportion of the chassis data records from the subset of selected chassis data records for which chassis parameters of the data record provided by the provisioning device are within the tolerance ranges specified for each chassis parameter.

Determining the proportion of the chassis data records from the subset of selected chassis data records for which current chassis parameters are within the tolerance ranges specified for each chassis parameter (step (d)) by the determination device (D) can be effected both for a single chassis parameter (e.g. "toe front left") as well as for any combination or the entirety of the chassis parameters stored in a data record. The chassis parameters on the basis of which the subset of chassis data records is selected are not identical to the chassis parameters on the basis of which the proportion of chassis data records is determined.

A basic idea of the invention is to enable a quick evaluation of the current state of the chassis without first having to manually select a data record from a target database. This is achieved in that the chassis parameters measured are compared, automatically and without further user interaction, with the subset of eligible chassis data records stored in the target database. From this comparison, possibly taking into account the probability with which a particular vehicle/chassis is to be expected in the workshop, a probability parameter ("score") is calculated, which indicates how likely it is that the chassis of the vehicle indicates an abnormality or is okay.

The chassis or wheel alignment measurement, in particular the evaluation of the chassis or wheel alignment measurement data obtained in the course of the wheel alignment measurement, can be considerably simplified and improved in this way. In particular, it is not necessary that the vehicle to be measured is "made known" to the device manually by entering parameters, such as e.g. a vehicle identification number ("VIN"), which uniquely identify the vehicle.

In one embodiment, the apparatus additionally comprises a comparison device, which is configured to compare the proportion of the chassis data records determined by the determination device, for which the current chassis parameters are within the specified tolerance ranges ("score"), with a predetermined limit value, and to output an optical and/or acoustic signal if the proportion of the chassis data records for which the currently determined chassis parameters are within the specified tolerance ranges, is smaller than the predetermined limit value. In this way, the operator/user can be automatically alerted by the apparatus if the evaluation has shown that the chassis is misaligned with a certain probability and therefore further examinations and/or a chassis or wheel alignment adjustment should be made.

In one embodiment, the determination device is configured to differently weight the individual chassis data records in determining the "score," i.e., the proportion of the chassis data records from the subset of chassis data records for which the current chassis parameters are within the specified tolerance ranges.

Since the probability that the vehicle to be measured is one of the vehicles for which a target data record is stored is generally not uniformly distributed, the quality of the evaluation can be significantly improved by taking into account the different probabilities.

This can be realized in particular with the aid of weighting parameters which are determined individually for each data record. For example, the following criteria may affect the weighting parameters for a particular chassis:

Distribution of vehicle makes/models/variants, possibly regionally different. For example, a VW Golf with standard chassis is more likely to be found in German workshops than a Japanese vehicle with sports chassis.

The distribution with respect to vehicle age, possibly also depending on the workshop. An authorized workshop as a rule is visited more frequently e.g. by newer models which are still in the warranty period, than a free workshop, in which older vehicles tend to prevail.

More formally, there is a total of target data records $\Omega$.

From this total, a subset $A \subseteq \Omega$ can be selected in advance, e.g. on the basis of parameters such as the wheelbase, the track width and/or the rim size.

For each $a_i \in A$, a relative weight $Y_i$ is determined, which describes the probability of the occurrence of the corresponding chassis in reality. Possible criteria for this have been mentioned before.

For a particular predicate (e.g. "toe front left within tolerance", or "all values within tolerance"), $$P(\text{predicate}) = \frac{\sum_i \gamma_i \, \delta_i(\text{predicate})}{\sum_i \gamma_i}$$

$$\text{for } \delta_i(\text{predicate}) = \begin{cases} 0, & \text{if predicate for } a_i \text{ not fulfilled} \\ 1, & \text{if predicate for } a_i \text{ fulfilled} \end{cases}$$

a probability P can thus be determined for the vehicle being currently measured:

In one embodiment, the selection device is configured to select those chassis data records in the subset A for which at least one previously determined chassis parameter is within a specified tolerance range. The at least one selected chassis parameter may comprise in particular the wheelbase, the track width, the rim size and/or the ride height of a chassis.

In this way, the quality of the evaluation is improved because chassis data records that definitely belong to other vehicles are excluded and are not considered in the evaluation.

In one embodiment, the determination device is configured to select the chassis data records on the basis of additional information, which may include in particular the make and/or the type of the vehicle. By using additional known information about the vehicle, the quality of the evaluation can be further improved.

In one embodiment, the apparatus also comprises an input device designed for manually entering additional information.

In particular, the apparatus can be designed interactively, with the probability being calculated initially on the basis of a relatively large number of target data records. The uncertainty resulting from the large number of target data records is indicated to the user in addition to the calculated probability. When the user narrows down the choice, e.g. by an explicit selection of a vehicle manufacturer, a model or a vehicle/model variant and/or by input in a free text search box, a new probability, which as a rule has a lower uncertainty, can be calculated and indicated.

In one embodiment, the apparatus comprises an automatic recognition device configured to determine the additional information. The automatic recognition device may comprise, in particular, an optical system, for example a camera, so that, on the basis of the information provided by the optical system, e.g. images of a brand logo or typical body features of the vehicle, it is capable to further narrow down the vehicle type and thus the number of eligible chassis data records.

In one embodiment, the provisioning device comprises a measuring device configured to determine the chassis parameters by measuring. In this case, the usual procedures and measuring methods can be used, as they are known for chassis or wheel alignment measurement.

In one embodiment, the apparatus comprises a printer that allows, either automatically or at the touch of a button, a printout of the measurement data and/or the evaluation.

DETAILED DESCRIPTION

Figure 1:
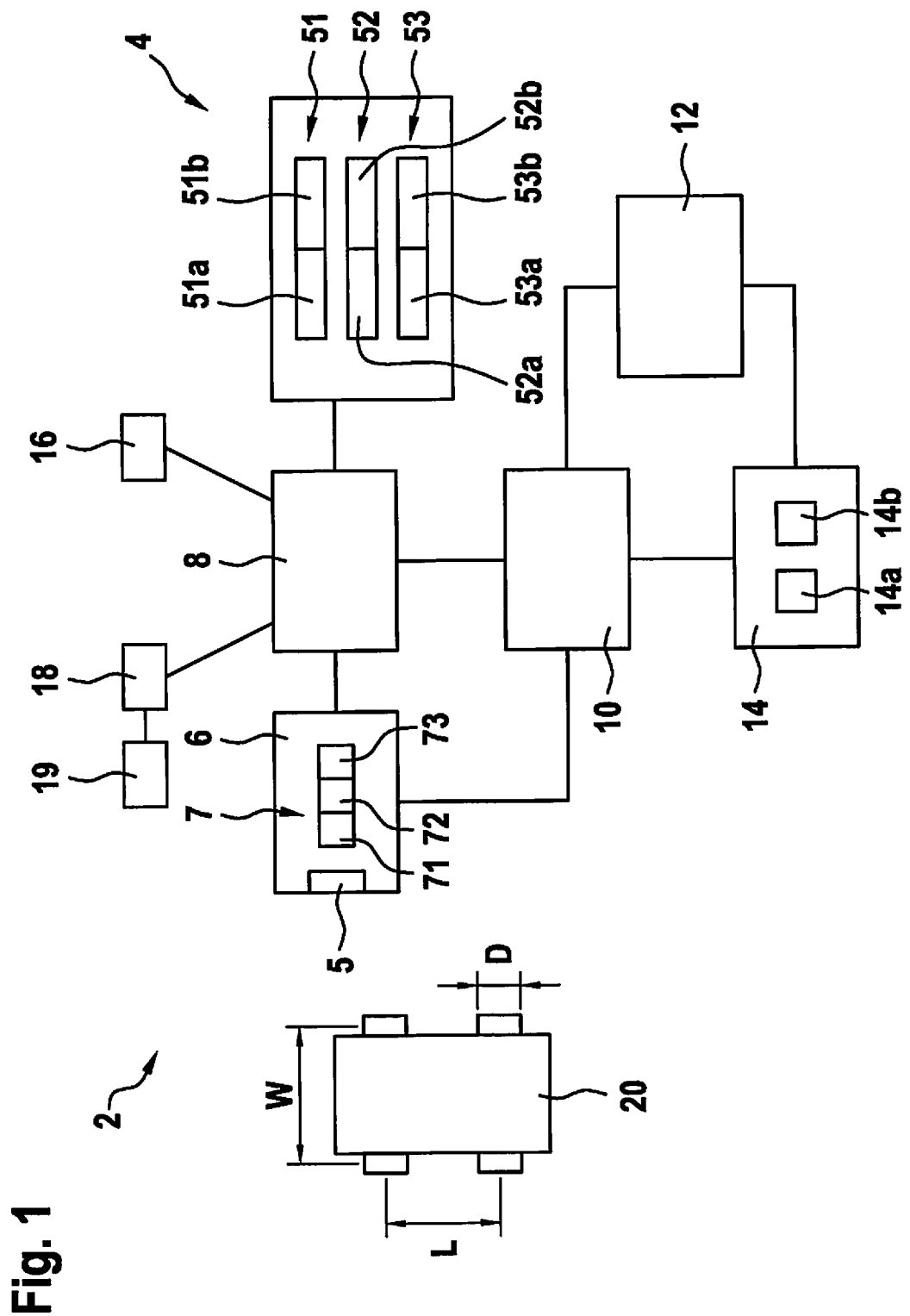
FIG. 1 shows a schematic illustration of an apparatus for automatically evaluating wheel alignment measurement data according to an exemplary embodiment of the invention.

FIG. 1 shows a schematic representation of an apparatus 2 for automatically evaluating chassis or wheel alignment measurement data. The apparatus 2 comprises, in particular, a memory device 4 which is configured to store chassis or wheel alignment data records 51, 52, 53, with each chassis data record 51, 52, 53 containing at least one chassis parameter 51a, 52a, 53a and a tolerance range 51b, 52b, 53b allocated to each chassis parameter 51a, 52a, 53a.

The apparatus 2 comprises furthermore a provisioning device 6 configured to provide a data record 7 of current chassis parameters 71, 72, 73, which comprises at least one current chassis parameter 71, 72, 73.

The provisioning device 6 may be provided with a receiving device 5 receiving the data record 7 in wire-bound manner, e.g. via a cable connection (not shown), or in wireless manner, e.g. via WLAN, Bluetooth®, etc., from an external measuring device (not shown). Alternatively, the provisioning device 6 itself may be formed with a measuring device 5 which makes it possible to determine at least one current chassis parameter 71, 72, 73 of a vehicle 20 to be measured.

The apparatus 2 also comprises a selection device 8 which is configured to select, on the basis of the data record 7 provided by the provisioning device 6, a subset of chassis data records 51, 52, 53 from the chassis data records 51, 52, 53 stored in the memory device 4. The selection device 8 in particular may be configured to select such chassis data records 51, 52, 53 for which at least one selected chassis parameter 71, 72, 73 of the data record 7 provided by the provisioning device 6 is within a specified tolerance range 71b, 72b, 73b.

The at least one selected chassis parameter 71, 72, 73 may comprise in particular the wheelbase L, the track width W, the rim size D and/or the ride height of the vehicle 20.

The apparatus 2 comprises furthermore a determination device 10 configured to determine the proportion of the chassis data records 51, 52, 53 from the subset of chassis data records 51, 52, 53, for which the current chassis parameters 71, 72, 73 of the data record 7 provided by the provisioning device 6 are within the tolerance range 51b, 52b, 53b specified for the particular chassis parameter 51a, 52a, 53. The proportion ("score") thus determined can be indicated in particular as a numerical quotient in the range between 0 and 1 or as a percentage between 0% and 100%.

The determination of the proportion ("score") of the chassis data records 51, 52, 53 from the subset of selected chassis data records 51, 52, 53 for which current chassis parameters 71, 72, 73 are within the tolerance ranges 51b, 52b, 53b specified for each chassis parameter 51a, 52a, 53a can be effected selectively for either a single chassis parameter 51a, 52a, 53a (e.g. B. "toe front left") as well as for any combination or the entirety of the chassis parameters 51a, 52a, 53a stored in a data record 51, 52, 53.

In this context, the determination device 10 can weight the chassis data records 51, 52, 53 differently, as has been described hereinbefore.

An output device 14, which may comprise in particular a screen 14a and/or a printer 14b, renders possible to display and/or output the measurement results and in particular the evaluation of the measurement results, in particular the proportion ("score") of the chassis data records 51, 52, 53 from the subset of chassis data records 51, 52, 53 for which the chassis parameters of the data record 7 provided by the provisioning device 6 are within the specified tolerance ranges 51b, 52b, 53b.

The apparatus 2 also comprises a comparison device 12 configured to compare the proportion of the chassis data records 51, 52, 53 determined by the determination device, for which the current chassis parameters 71, 72, 73 are within the specified tolerance ranges 51b, 52b, 53b, with a predetermined limit value, and to issue an additional notification (warning), if the proportion of the chassis data records 51, 52, 53 for which the current chassis parameters 71, 72, 73 are within the specified tolerance ranges 51b, 52b, 53b is smaller than the predetermined limit value.

The exemplary embodiment of an apparatus 2 according to the invention for automatically evaluating chassis or wheel alignment measurement data, as shown in FIG. 1, also comprises an input device 16, permitting the manual input of additional information about the vehicle 20 to be measured and evaluated. This additional information permits an even exacter identification of the vehicle 20 to be measured and evaluated. For example, it is possible to input via the input device 16 the vehicle manufacturer, the model, the vehicle/model variant and/or the VIN of the vehicle 20, if these are known.

In addition to or as an alternative, there is provided an automatic recognition device 18, which allows additional information, in particular the vehicle manufacturer, the model and/or the vehicle or model variant of the vehicle 20 to be determined automatically. The automatic recognition device 18 may comprise, for example, at least one optical system, such as e.g. a camera, which allows recording of an image of the vehicle 20 to be measured and/or a portion of the vehicle 20 to be measured and automatic determination of the vehicle manufacturer, the model and/or the vehicle/model variant of the vehicle 20 by evaluation of the recorded image. This can be done, for example, by comparing at least one recorded image with images of various vehicles, manufacturer logos etc. stored in an image database 19.

Figure 2:
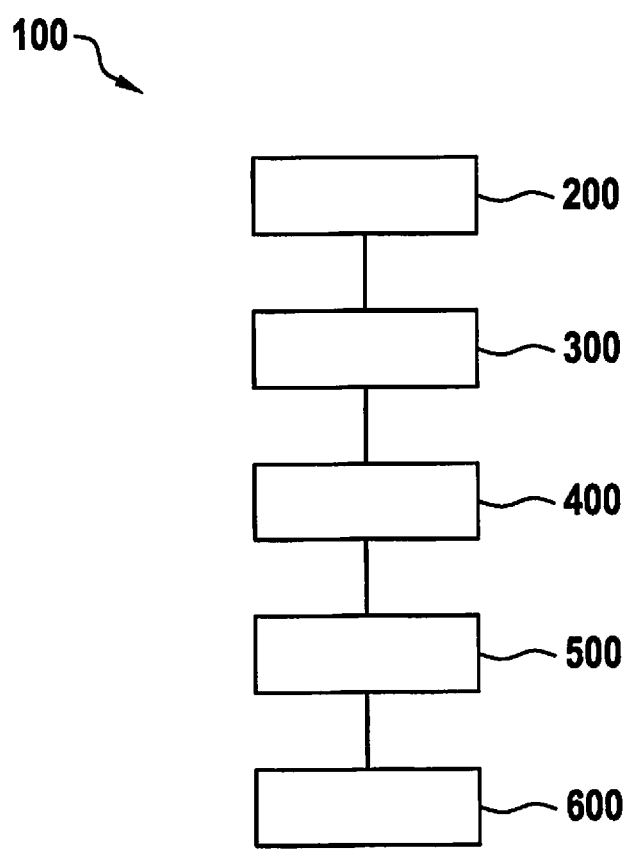
FIG. 2 illustrates a method for automatically evaluating wheel alignment measurement data according to an embodiment of the invention.

FIG. 2 illustrates a method 100 for automatically evaluating chassis or wheel alignment measurement data according to an embodiment of the invention. The method 100 comprises in particular:

providing 200 a number of chassis data records 51, 52, 53, with each chassis data record 51, 52, 53 comprising at least one chassis parameter 51a, 52a, 53a and a tolerance range 51b, 52b allocated to each chassis parameter 51a, 52a, 53a, 53b;

providing 300 a data record 7 of current chassis parameters 71, 72, 73, which contains at least one chassis parameter 71, 72, 73;

selecting 400 a subset of chassis data records 51, 52, 53 from the number of chassis data records 51, 52, 53, on the basis of the provided data record 7 of current chassis parameters 71, 72, 73; and determining 500 the proportion of the chassis data records 51, 52, 53 from the subset of selected chassis data records 51, 52, 53 for which the current chassis parameters 71, 72, 73 are within the specified tolerance ranges 51b, 52b, 53b.

The proportion thus determined ("score") may be indicated in particular as a numerical quotient in the range between 0 and 1, or as a percentage between 0% and 100%.

In this context, the individual chassis data records 51, 52, 53 can be weighted differently, as has been described hereinbefore.

The determination of the proportion of chassis data records 51, 52, 53 from the subset of selected chassis data records 51, 52, 53 for which current chassis parameters 71, 72, 73 are within the tolerance ranges 51b, 52b, 53b specified for each chassis parameter 51a, 52a, 53a, can be effected both for a single chassis parameter 51a, 52a, 53a (e.g. "toe front left") as well as for any combination or the entirety of the chassis parameters 51a, 52a, 53a stored in a data record 51, 52, 53.

In selecting 400 the subset of chassis data records 51, 52, 53, in particular such chassis data records 51, 52, 53 can be selected for which at least one selected current chassis parameter 71, 72, 73 of the data record 7 provided by the provisioning device 6 is within a specified tolerance range 51b, 52b, 53b. The at least one selected current chassis parameter 71, 72, 73 may comprise in particular the wheelbase L, the track width W, the rim size D and/or the ride height of a chassis of the vehicle 20 to be measured.

As an alternative or in addition, there may be used additional information, including in particular the make and/or type of the vehicle 20 to be measured, for selecting the subset of chassis data records 51, 52, 53. This additional information can be entered manually and/or automatically determined. The additional information can also be obtained by means of an optical system which takes at least one image of the vehicle 20 to be measured and evaluates said image.

In the embodiment illustrated in FIG. 2, the method 2 additionally comprises the step of comparing 600 the previously determined proportion ("score") of the chassis data records 51, 52, 53 for which the current chassis parameters 71, 72, 73 are within the specified tolerance ranges 51b, 52b, 53b, with a predetermined limit value and outputting a notification if the proportion of the chassis data records 51, 52, 53 for which the current chassis parameters 71, 72, 73 are within the specified tolerance ranges 51b, 52b, 53b, is smaller than the predetermined limit value.

As a result, the chassis or wheel alignment measurement and in particular the evaluation of chassis or wheel alignment measurement data of previously "unknown" vehicles can be considerably simplified and accelerated in comparison with the previously known methods.

The invention claimed is:

1. An apparatus for automatically evaluating chassis or wheel alignment measurement data, the apparatus, comprising:
   a memory device configured to store a number of chassis or wheel alignment data records, each chassis data record containing at least one chassis parameter and a tolerance range allocated to each chassis parameter;
   a provisioning device configured to provide a data record of currently measured chassis parameters, the data record comprising at least one currently measured chassis parameter;
   a selection device configured to select, on the basis of the data record provided by the provisioning device, a subset of chassis data records from the chassis data records stored in the memory device; and
   a determination device configured to determine a proportion of the chassis data records from the subset of chassis data records for which current chassis parameters of the data record provided by the provisioning device are within the tolerance ranges.

2. The apparatus according to claim 1, further comprising:
   a comparison device configured to compare the proportion of the chassis data records determined by the determination device, for which current chassis parameters are within the tolerance ranges, with a predetermined limit value, and to output a signal if the proportion of the chassis data records in which the current chassis parameters are within the tolerance ranges is smaller than the predetermined limit value.

3. The apparatus according to claim 1, wherein the determination device is configured to differently weight the chassis data records in determining the proportion of the chassis data records from the subset of chassis data records in which current chassis parameters are within the tolerance ranges.

4. The apparatus according to claim 1, wherein the selection device is configured to select those chassis data records for which at least one selected current chassis parameter is within one of the tolerance ranges.

5. The apparatus according to claim 4, wherein the at least one selected current chassis parameter comprises at least one of a wheelbase, a track width, a rim size, and a ride height of a vehicle to be measured.

6. The apparatus according to claim 1, wherein the determination device is configured to select the chassis data records on the basis of additional information that includes at least one of a make and a type of a vehicle to be measured.

7. The apparatus according to claim 6, further comprising at least one of:
   an input device for manually entering the additional information; and
   an automatic recognition device for automatically determining the additional information.

8. The apparatus according to claim 7, wherein the automatic recognition device includes an optical system.

9. The apparatus according to claim 1, wherein the provisioning device includes a measuring device that determines the at least one current chassis parameter by measuring.

10. A method for automatically evaluating chassis or wheel alignment measurement data, comprising:
    providing a number of chassis or wheel alignment data records, each data record containing at least one chassis parameter and a tolerance range allocated to each chassis parameter;
    providing a data record of currently measured chassis parameters that includes at least one chassis parameter;
    selecting a subset of chassis data records from the number of chassis data records on the basis of the provided data record of currently measured chassis parameters; and
    determining a proportion of the chassis data records from the subset of selected chassis data records for which currently measured chassis parameters of the provided data record are within the tolerance ranges.

11. The method according to claim 10, further comprising:
    comparing the determined proportion of the chassis data records for which current chassis parameters are within the tolerance ranges with a predetermined limit value; and
    outputting a notification if the proportion of the chassis data records for which the current chassis parameters are within the tolerance ranges is smaller than the predetermined limit value.

12. The method according to claim 10, further comprising weighting the chassis data records differently in the determining step.

13. The method according to claim 10, wherein the selecting of the subset of chassis data records includes selecting those chassis data records for which at least one selected current chassis parameter is within one of the tolerance ranges.

14. The method according to claim 13, wherein the at least one selected current chassis parameter includes at least one of a wheelbase, a track width, a rim size, and a ride height of a vehicle to be measured.

15. The method according to claim 10, wherein the selecting of the subset of chassis data records includes selecting the chassis data records on the basis of additional information that includes at least one of a make and a type of a vehicle.

16. The method according to claim 15, wherein the additional information is one of entered manually and determined automatically.

17. The method according to claim 16, wherein the additional information is determined by an optical system.

* * * * *